(12) United States Patent
Higley et al.

(10) Patent No.: US 10,997,807 B2
(45) Date of Patent: May 4, 2021

(54) METHOD TO CREATE A BUILDING PATH FOR BUILDING OCCUPANTS BASED ON HISTORIC INFORMATION

(71) Applicant: Carrier Corporation, Palm Beach Gardens, FL (US)

(72) Inventors: Jason Higley, Pittsford, NY (US); Wilmann Gomez, New Britain, CT (US); Dang Nguyen, Alpharetta, GA (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/636,933

(22) PCT Filed: Aug. 20, 2018

(86) PCT No.: PCT/US2018/047049
§ 371 (c)(1),
(2) Date: Feb. 6, 2020

(87) PCT Pub. No.: WO2019/036707
PCT Pub. Date: Feb. 21, 2019

(65) Prior Publication Data
US 2020/0372736 A1 Nov. 26, 2020

Related U.S. Application Data

(60) Provisional application No. 62/547,638, filed on Aug. 18, 2017.

(51) Int. Cl.
H04W 24/00 (2009.01)
G07C 9/00 (2020.01)
(Continued)

(52) U.S. Cl.
CPC .......... *G07C 9/00309* (2013.01); *G07C 9/29* (2020.01); *H04W 4/029* (2018.02); *G07C 2209/63* (2013.01)

(58) Field of Classification Search
CPC .............. G07C 9/00309; G07C 9/29; G07C 2209/063; H04W 4/0029; H04W 88/02; H04M 1/72519; H04M 1/72522
(Continued)

(56) References Cited

U.S. PATENT DOCUMENTS 5,537,102 A 7/1996 Pinnow
6,209,685 B1 4/2001 Zaharia
(Continued)

FOREIGN PATENT DOCUMENTS

WO 2005052885 A1 6/2005
WO 2009151925 A1 12/2009
(Continued)

OTHER PUBLICATIONS

Notification of Transmittal of the International Search Report for International Application No. PCT/US2018/047049; dated Nov. 30, 2018; Report Received Date: Dec. 7, 2018; 11 pages.
(Continued)

*Primary Examiner* — Danh C Le
(74) *Attorney, Agent, or Firm* — Cantor Colburn LLP

(57) ABSTRACT

A method of determining a path, the method comprising: determining a next event for the user device; mapping an event location of the next event; obtaining a current position of the user device; obtaining an access list for the user device, the access list including access devices that the user device is authorized to activate; obtaining a path list including one or more paths from the current position to the event location; and selecting a path.

20 Claims, 2 Drawing Sheets

Figure 1:
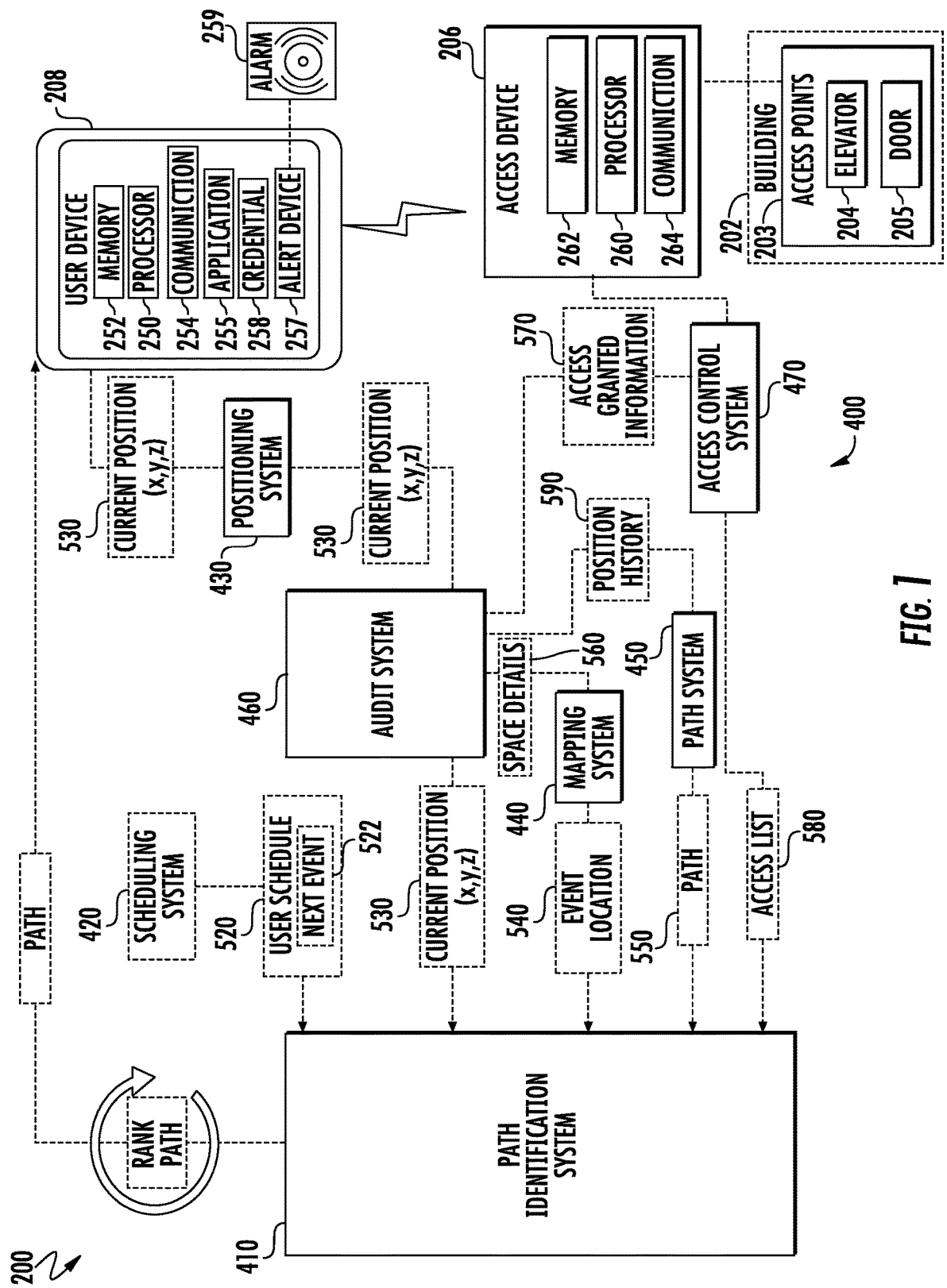

(51) Int. Cl.
*H04W 4/029* (2018.01)
*G07C 9/29* (2020.01)

(58) Field of Classification Search
USPC .................. 455/456.1, 456.5, 550.1, 410
See application file for complete search history.

(56) References Cited

U.S. PATENT DOCUMENTS

| | | | |
|---|---|---|---|
| 7,222,241 | B2 | 5/2007 | Milgramm et al. |
| 7,266,379 | B2 | 9/2007 | Blight et al. |
| 7,305,245 | B2 | 12/2007 | Alizadeh-Shabdiz et al. |
| 7,734,513 | B2 | 6/2010 | Bonner et al. |
| 8,493,952 | B2 | 7/2013 | Suryanarayana et al. |
| 8,494,576 | B1 | 7/2013 | Bye et al. |
| 8,538,687 | B2 | 9/2013 | Plocher et al. |
| 8,548,736 | B2 | 10/2013 | Chan |
| 8,565,783 | B2 | 10/2013 | Yang et al. |
| 8,791,790 | B2 | 7/2014 | Robertson |
| 8,825,407 | B2 | 9/2014 | Brennan et al. |
| 8,874,143 | B2 | 10/2014 | Okatake et al. |
| 9,439,044 | B2 | 9/2016 | Hopcraft et al. |
| 9,491,574 | B2 | 11/2016 | O'Sullivan et al. |
| 9,558,604 | B2 | 1/2017 | Robertson et al. |
| 2010/0126337 | A1* | 5/2010 | Carter ................ F41H 5/20 89/36.02 |
| 2011/0106445 | A1 | 5/2011 | Mayer et al. |
| 2012/0254084 | A1 | 10/2012 | Richter et al. |
| 2015/0219757 | A1 | 8/2015 | Boelter et al. |
| 2015/0304300 | A1* | 10/2015 | Bender ............... H04L 63/0421 726/4 |
| 2016/0005003 | A1* | 1/2016 | Norris ................. H04L 65/403 705/7.19 |
| 2016/0101833 | A1* | 4/2016 | Gilloteaux ............. B63B 1/048 416/85 |
| 2016/0157057 | A1 | 6/2016 | Kim |
| 2016/0248782 | A1* | 8/2016 | Troesch ............... H04L 63/108 |
| 2016/0284139 | A1* | 9/2016 | Klein ..................... G06F 16/955 |
| 2017/0026185 | A1* | 1/2017 | Moses .................... H04L 9/006 |
| 2017/0061715 | A1 | 3/2017 | Busch-Sorensen et al. |
| 2018/0252970 | A1* | 9/2018 | Iwakabe ................ G09G 3/3648 |
| 2018/0287901 | A1* | 10/2018 | Bisada .................. H04L 41/069 |
| 2020/0125218 | A1* | 4/2020 | Bender .................. H04L 12/28 |

FOREIGN PATENT DOCUMENTS

| | | |
|---|---|---|
| WO | 2013117723 A1 | 8/2013 |
| WO | 2016087478 A1 | 6/2016 |

OTHER PUBLICATIONS

Written Opinion of the International Searching Authority for International Application No. PCT/US2018/047049; dated Nov. 30, 2018; Report Received Date: Dec. 7, 2018; 14 pages.

* cited by examiner

METHOD TO CREATE A BUILDING PATH FOR BUILDING OCCUPANTS BASED ON HISTORIC INFORMATION

CROSS-REFERENCE TO RELATED APPLICATIONS

This application is a National Stage Application of International Application No. PCT/US2018/047,049 filed Aug. 20, 2018, which claims the benefit of U.S. Provisional Application Ser. No. 62/547,638 filed Aug. 18, 2017, the disclosures of which are incorporated herein by reference in their entirety.

BACKGROUND

The subject matter disclosed herein generally relates to the field of access systems, and more particularly to an apparatus and method for determining a path through an access system.

Existing access controls allow mobile devices to unlock access devices. Existing online access control to access points are commonly set up such that the mobile devices must be presented to an access device in order to unlock the access device. The desire to control access to access points is increasing as security requirements increase and the expense to install access devices decreases. However with buildings becoming more and more secure, one must present their mobile device to several different access points on their path to a destination. Determining a path through multiple access points and continually presenting the mobile device to multiple access points is exhaustive, monotonous, and wastes valuable time, but required to ensure security.

BRIEF SUMMARY

According to one embodiment, a method of determining a path, the method comprising: determining a next event for the user device; mapping an event location of the next event; obtaining a current position of the user device; obtaining an access list for the user device, the access list including access devices that the user device is authorized to activate; obtaining a path list including one or more paths from the current position to the event location; and selecting a path.

In addition to one or more of the features described above, or as an alternative, further embodiments may include: transmitting a command to each access device when the user device is located within a position boundary of the access device; and adjusting the access device when the command is received.

In addition to one or more of the features described above, or as an alternative, further embodiments may include that the determining a next event further comprises: checking a user schedule of a user device; and determining a next event on the user schedule in response to a current time.

In addition to one or more of the features described above, or as an alternative, further embodiments may include that the determining a next event further comprises: receiving a user input selecting the next event.

In addition to one or more of the features described above, or as an alternative, further embodiments may include that the obtaining one or more paths from the current position to the event location, the method further comprises: receiving a plurality of current positions of the user device; receiving access granted information from one or more access devices; obtaining space details of one or more access devices in response to the access granted information; and creating one or more paths in response to the plurality of current positions of the user device, the space details, and the access granted information.

In addition to one or more of the features described above, or as an alternative, further embodiments may include that the ranking further comprises: removing paths that include an access device that is not included on the access list for the user device.

In addition to one or more of the features described above, or as an alternative, further embodiments may include that the selecting further comprises: ranking each path in response to at least one of a path length, a path time, and a path frequency; displaying the one or more paths on the user device in an order of descending rank; and receiving a selection input from the user device, the selection input identifying one of the paths.

In addition to one or more of the features described above, or as an alternative, further embodiments may include that the selecting further comprises: ranking each path in response to at least one of a path length, a path time, and a path frequency; and selecting the path with the highest ranking.

In addition to one or more of the features described above, or as an alternative, further embodiments may include that the adjusting further comprises: unlocking a door lock.

In addition to one or more of the features described above, or as an alternative, further embodiments may include that the adjusting further comprises: opening an elevator door.

In addition to one or more of the features described above, or as an alternative, further embodiments may include that the adjusting further comprises: unlocking a turnstile.

In addition to one or more of the features described above, or as an alternative, further embodiments may include: activating an alarm on the user device when it is time to leave the current position and travel along the path selected.

According to another embodiment, an access control system is provided. The access control system comprising: a processor; and a memory comprising computer-executable instructions that, when executed by the processor, cause the processor to perform operations, the operations comprising: determining a next event for the user device; mapping an event location of the next event; obtaining a current position of the user device; obtaining an access list for the user device, the access list including access devices that the user device is authorized to activate; obtaining a path list including one or more paths from the current position to the event location; and selecting a path.

In addition to one or more of the features described above, or as an alternative, further embodiments may include that the operations further comprise: transmitting a command to each access device when the user device is located within a position boundary of the access device; and adjusting the access device when the command is received.

In addition to one or more of the features described above, or as an alternative, further embodiments may include that the determining a next event further comprises: checking a user schedule of a user device; and determining a next event on the user schedule in response to a current time.

In addition to one or more of the features described above, or as an alternative, further embodiments may include that the determining a next event further comprises: receiving a user input selecting the next event.

In addition to one or more of the features described above, or as an alternative, further embodiments may include that prior to the obtaining one or more paths from the current position to the event location, the method further comprises: receiving a plurality of current positions of the user device;

receiving access granted information from one or more access devices; obtaining space details of one or more access devices in response to the access granted information; and creating one or more paths in response to the plurality of current positions of the user device, the space details, and the access granted information.

In addition to one or more of the features described above, or as an alternative, further embodiments may include that the ranking further comprises: removing paths that include an access device that is not included on the access list for the user device.

In addition to one or more of the features described above, or as an alternative, further embodiments may include that the selecting further comprises: ranking each path in response to at least one of a path length, a path time, and a path frequency; displaying the one or more paths on the user device in an order of descending rank; and receiving a selection input from the user device, the selection input identifying one of the paths.

In addition to one or more of the features described above, or as an alternative, further embodiments may include that the selecting further comprises: ranking each path in response to at least one of a path length, a path time, and a path frequency; and selecting the path with the highest ranking.

Technical effects of embodiments of the present disclosure include determining a path for a mobile device based on historical path data and adjusting each access device along the path when the mobile device is located within a position boundary of the access device.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

Figure 2:
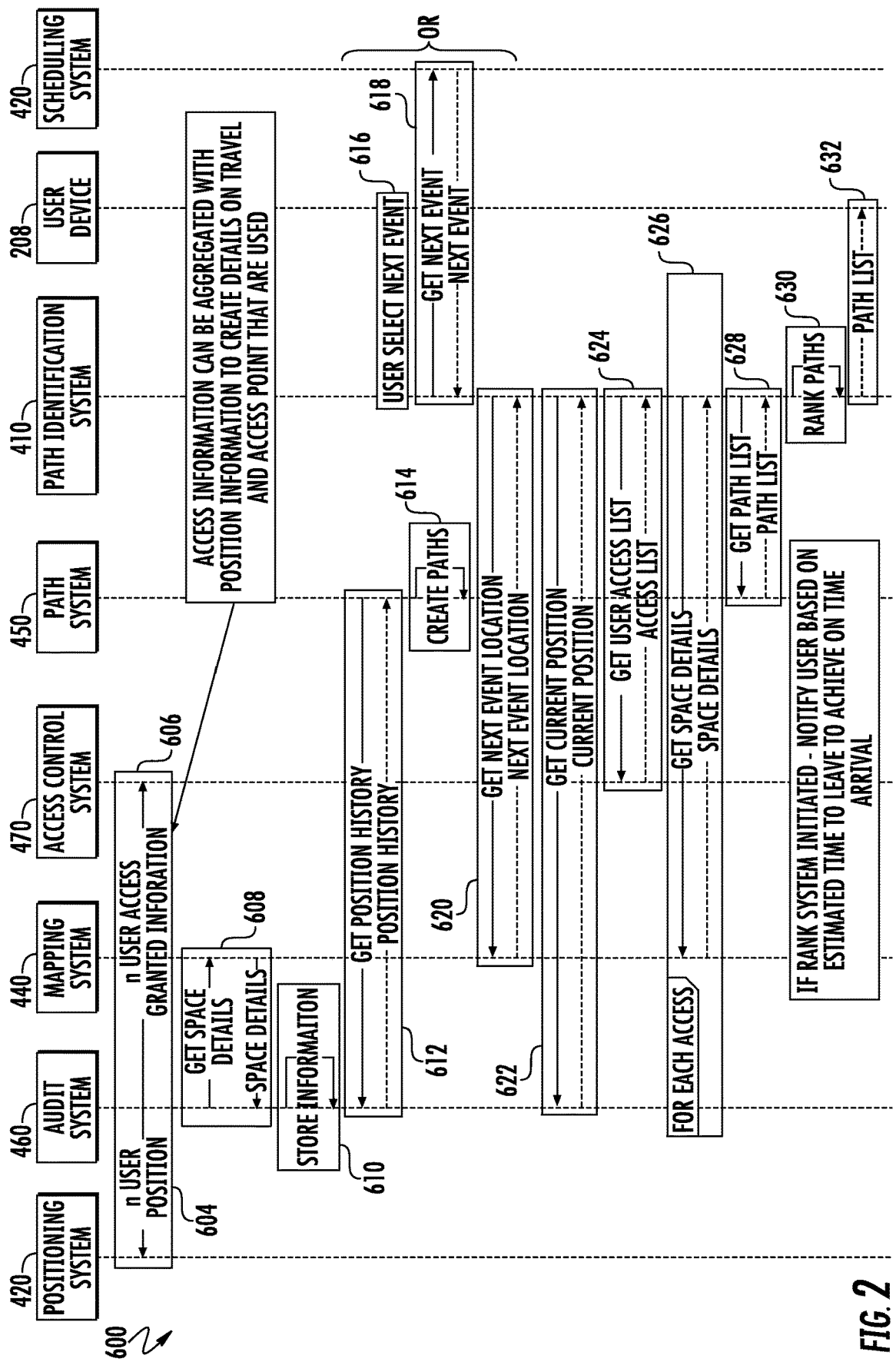

The following descriptions should not be considered limiting in any way. With reference to the accompanying drawings, like elements are numbered alike:

FIG. 1 illustrates a schematic view of a system, in accordance with an embodiment of the disclosure; and FIG. 2 is a flow diagram illustrating a method of controlling access to at least one access point along a path, according to an embodiment of the present disclosure.

DETAILED DESCRIPTION

A detailed description of one or more embodiments of the disclosed apparatus and method are presented herein by way of exemplification and not limitation with reference to the Figures.

FIG. 1 depicts a system 200 in an example embodiment. The system 200 includes at least one access device 206 to grant/deny access to access points 203, such as for example an elevator 204 or a door 205. The access device 206 grant/deny access to access points 203 by adjusting the access point 203, such as, for example, unlocking a door lock or opening an elevator door. The access points 203 may be installed at a building 202. In some embodiments, the building 202 may be a building or a collection of buildings that may or may not be physically located near each other. The building 202 may include any number of floors. Persons entering the building 202 may enter at a lobby floor, or any other floor, and may go to a destination floor via one or more conveyance devices, such as the elevator 204. Persons entering the building 202 may be required to enter a door 205. In another non-limiting embodiment, the door 205 may be outside of a building, such as, for example a car door. The door 205 may include but is not limited to a door in a wall of the building 202, a door on the outside of the building 202, a garage door, a parking lot access gate, a turnstile, a car door, or similar access point known to one of skill in the art.

The access points 203 may be operably connected to one or more access devices 206. The access device 206 may be configured to control access to the access points 203, such as, for example an elevator 204 and a door 205. Although only one elevator 204 is shown in FIG. 1, it is understood that any number of elevators 204 may be used in the system 200. It is understood that other components of the elevator 204 (e.g., elevator car, doors, drive, counterweight, safeties, etc.) are not depicted for ease of illustration. It is also understood that each elevator 204 may utilize one or more access devices 206. In an example, there may be an access device 206 located on each floor of the building 202 located proximate an elevator shaft. Further, although only one door 205 is shown in FIG. 1, it is understood that any number of doors 205 may be used in the system 200. It is understood that other components of doors 205 are not depicted for ease of illustration (e.g., locks). It is also understood that each door 205 may utilize one or more access devices 206.

In a non-limiting example, the access device 206 may be a door reader or door strike. The access device 206 may include a processor 260, memory 262 and communication module 264 as shown in FIG. 1. The processor 260 can be any type or combination of computer processors, such as a microprocessor, microcontroller, digital signal processor, application specific integrated circuit, programmable logic device, and/or field programmable gate array. The memory 262 is an example of a non-transitory computer readable storage medium tangibly embodied in the access device 206 including executable instructions stored therein, for instance, as firmware. The memory 262 may store a unique device ID for each access device 206. The memory 262 may also store a set of geo-location information for each access device 206. The communication module 264 allows for secure bi-directional communication wirelessly with a user device 208. The communication module 264 may implement one or more communication protocols as described in further detail herein.

Also shown in FIG. 1 is a user device 208. The user device 208 is capable of secure bi-directional communication with the access device 206, a positioning system 430, and a path identification system 410. The user device 208 may be a computing device such as a desktop computer. The user device 208 may also be a mobile computing device that is typically carried by a person, such as, for example a phone, PDA, smart watch, tablet, laptop, etc. The user device 208 may also be two separate devices that are synced together such as, for example, a cellular phone and desktop computer synced over an internet connection. The user device 208 may include a processor 250, memory 252 and communication module 254 as shown in FIG. 1. The processor 250 can be any type or combination of computer processors, such as a microprocessor, microcontroller, digital signal processor, application specific integrated circuit, programmable logic device, and/or field programmable gate array. The memory 252 is an example of a non-transitory computer readable storage medium tangibly embodied in the user device 208 including executable instructions stored therein, for instance, as firmware. The communication module 254 may implement one or more communication protocols as described in further detail herein. The user device 208 is configured to store a unique credential 258 that may be shared with the access device 206 and a plurality of interconnected systems 400, discussed further below. In a non-limiting example, the user device 208 may belong to an employee and/or resident of the building 202. The user device 208 may include an alert device 257 configured to activate an alarm 259. In two non-limiting examples, the alert device 257 may be a vibration motor, audio speaker, and/or display screen. The alarm 259 may be audible, visual, haptic, and/or vibratory. The user device 208 may also include an application 255. Embodiments disclosed herein, may operate through the application 255 installed on the user device 208.

As shown in FIG. 1, the system 200 also includes a plurality of interconnected systems 400 including: a positioning system 430, a scheduling system 420, an audit system 460, an access control system 470, a path system 450, a mapping system 440, and a path identification system 410. In the illustration of FIG. 1, the interconnected systems 400 are illustrated as separate systems. In an embodiment, at least one of the positioning system 430, the scheduling system 420, the audit system 460, the access control system 470, the path system 450, the mapping system 440, and the path identification system 410 may be combined into a single system. In an embodiment, at least one of the positioning system 430, the scheduling system 420, the audit system 460, the access control system 470, the path system 450, the mapping system 440, and the path identification system 410 is within the user device 208.

The interconnected systems 400 may each include a processor, memory and communication module. For ease of illustration, the processor, memory, and communication module are not shown in FIG. 1. The processor can be any type or combination of computer processors, such as a microprocessor, microcontroller, digital signal processor, application specific integrated circuit, programmable logic device, and/or field programmable gate array. The memory is an example of a non-transitory computer readable storage medium tangibly embodied in or operably connected to the path determination system including executable instructions stored therein, for instance, as firmware. The communication module may implement one or more communication protocols as described in further detail herein.

The positioning system 430 is configured to determine the current position 530 of the user device 208. The positioning system 430 may be included in the user device 208. The current position 530 includes the (x, y, z) coordinates of the user device 208 on a map. The (x, y, z) coordinates may translate to a latitude, a longitude, and an elevation. The positioning system 430 may use various methods in order to determine the current position 530 of the user device 208 such as, for example, GPS, Bluetooth triangulation, WiFi triangulation, cellular signal triangulation, or any other location determination method known to one of skill in the art. The positioning system 430 is configured to transmit the current position 530 to the user device 208 and audit system 460. The audit system 460 is configured to receive the current position 530 from the positioning system 430 and store each current position 530 received.

The access control system 470 is configured to control and store an access list 550 that includes the access device 206 to which each credential 258 has been granted access. The access control system 470 is in electronic communication with each access device 206 and receives access granted information 570. This access granted information 570 will depict which access devices 206 the credential 258 on the user device 208 has requested access to in the past. For example, there may be three turnstiles to enter when entering a building 203 and the user of the user device 208 may always enter through the middle turnstile out of habit. The control system 470 is configured to transmit the access granted information 570 to the audit system 460. The audit system 460 is configured to receive the access granted information.

The mapping system 440 is configured to store the (x, y, z) coordinates of meeting rooms and access devices 206 and transmit that information when requested. The mapping system 440 may contain a physical and/or logical map for all spaces and device in the building 202. The spaces and device may include meeting rooms and access devices 206, respectively. The audit system 460 transmits the access granted information 570 to the mapping system 440. The mapping system 440 is configured to provide space details 560 to the audit system 560 in response to the access granted information 570. The space details 560 may include the (x, y, z) coordinates of each access device 206 from the access granted information 570. The audit system 460 generates a position history 590 in response to the current positions 530, access granted information, and the space details 567.

The path system 450 is configured to determine a list of paths 550 in response to position history 590. The paths 550 may include information to describe the route a user of a user device 208 may take from a first position (ex: current location 530) to a second position (ex: event location 540). In a non-limiting example, the paths 550 may include the hallways one may traverse, the elevators 204 one may take, the doors 205 one may goes through, and the turnstiles one may go through to get from a first position to a second position. The first position may be a current position 530 of a user device 208 and the second position may be an event location 540.

The scheduling system 420 holds user schedules 520 that may include the calendar associated with the user of the user device 208 including but not limited to meetings, events, and reminders. In an example, the scheduling system 420 may include electronic calendars such as, Microsoft Outlook Calendars, Gmail Calendars, iCloud Calendar, and Android Calendars. The scheduling system 420 is configured to transmit the next event 522 on the calendar for the user device 208 to the path identification system 410. In an alternative embodiment, the next event 522 may be selected by a user on the user device 208 through a user input such as selecting a destination, typing in the destination, speaking the destination, or any other similar user input method known to one of skill in the art. The next event 522 may be destination instead of a schedule meeting.

The path identification system 410 is configured to obtain the current position 530, the next event 522, access lists 580, next event location 540, and obtain paths 550 from the current position 530 to the next event location 540. The path identification system 410 is also configured to rank the paths 550 and transmit the ranking to the user device 206. The paths 550 may be ranked based on various criteria including but not limited to path length, a path time, and a path frequency. Through an application 255 on the user device 206, the user may select a path 550 to take via a selection input. The selection input may be a confirmation where the user may select yes or perform and action/gesture to indicate confirmation. In three non-limiting examples, the selection input may be touching a touch screen of the user device 208, clicking a physical button, or using a voice command. In an embodiment, the ranked paths 550 may be displayed on the user device 208 in order of descending ranking.

The access list 580 may also be transmitted to the path identification 410 system in order to ensure that the path identification system 410 ranks paths 550 that a user of a user device 208 has access to. In an embodiment, the access list 580 also includes at least one of a position boundary for each access device 206 on the access list 580 and an access device command for each access device 206 on the access device list 580. The position boundary is a range around an access device 206 from which a user device 208 may transmit an access command to adjust the access device 206. For example, the position boundary for a door lock may be 3 ft. (91.44 cm), thus the door lock will only unlock when the user device 208 is within 3 ft. (91.44 cm) of the door lock. The access list 580 may be transmitted to the user device 208 and the user device 208 may continually monitor the current position 530 to determine whether the user device 208 is within the position boundary of an access device 206.

The user device 208 communicates with the access device 206 and the interconnected systems 400. The communication may occur over a wireless network, such as 802.11x (WiFi), short-range radio (Bluetooth), cellular, satellite, etc. In some embodiments, an interconnected system 400 and the access device 206 may include, or be associated with (e.g., communicatively coupled to) a networked system, such as kiosk, beacon, lantern, bridge, router, network node, building intercom system, etc. The networked system may communicate with the user device 208 using one or more communication protocols or standards. For example, the networked system may communicate with the user device 208 using near field communications (NFC). In an embodiment, the user device 208 may communicated with an access device 206 through a networked system. In other embodiments, the user device 208 may establish communication with an interconnected system 400 or an access device 206 that is not associated with a networked system in the building 202. This connection may be established with various technologies including GPS, 802.11x (WiFi), cellular, or satellite, by way of non-limiting example. In example embodiments, the user device 208 communicates over multiple independent wired and/or wireless networks. Embodiments are intended to cover a wide variety of types of communication between the user device 208, the access device 206 and interconnected system 400, thus embodiments are not limited to the examples provided in this disclosure.

Referring now to FIG. 2, while referencing components of FIG. 1. FIG. 2 shows a flow chart of method 600 of method of determining a path 550, in accordance with an embodiment of the disclosure. At block 604, the audit system 460 receives a plurality of current positions 530 of the user device 208 from the positioning system 420. The plurality of current positions may be all the detected current positions 530 of the user device 208 over a selected period of time, such as, for example, a week, a month, a year, a length of employment, etc. At block 606, the audit system 460 receives access granted information 570 from one or more access devices 206 from the access control system 470. As mentioned above, the access granted information 570 may list all the access devices 206 that a user device 208 has attempted to access over a selected period of time, such as, for example, a week, a month, a year, a length of employment, etc. At block 608, the audit system 460 obtains space details 560 of one or more access devices 206 in response to the access granted information 570. At block 610, the plurality of current positions 530, the access granted information 570, and the space details 560 are stored within the audit system 460 as the positional history 590 of the user device 208.

At block 612, the path system 450 obtains the positional history 590 of the user device 208 and creates one or more paths 550 in response to the plurality of current positions 530, the access granted information 570, and the space details 560. The paths 550 may depict routes the user of the user device 208 has taken in the past and/or is likely to take in the future. At block 616 and 618 a next event 522 for the user of the user device 208 is determined by either the user selecting the next event 522 in an application 255 on the user device 208 through a user input at block 616 or the path identification system 410 checks a user schedule 520 in the scheduling system 420 and determines a next event 522 on the user schedule 520 in response to a current time at block 618.

At block 620 the path identification system 410 maps an event location 540 of the next event 522 using the mapping system 440. At block 622, the path identification system 410 obtains the current position 530 of the user device 208 from the audit system 460. At block 624, the path identification system 410 obtains an access list 580 for the user device from the access control system 470. The access list 580 includes access devices 206 that the user device 208 is authorized to activate.

At block 626, the path identification system 410 obtains space details 560 for each access device from the mapping system 440. The space details 560 may include the (x, y, z) coordinates of each access device 206 on the access list 580. At block 628, the path identification system 410 obtains a path list including one or more paths 550 from the current position 530 to the event location 540.

At block 630, the path identification system 410 may rank each path in response to at least one of a path length, a path time, and a path frequency. The path frequency being the number of times a user of a user devise 208 has taken a path 550 previously. The path identification system 410 may remove paths 550 that include an access device 206 that is not included on the access list 580 for the user device 208. A path 550 may either be chosen automatically by defaulting to the highest rank; or at block 632 the one or more paths may be displayed on the user device 208 in an order of descending rank through the application 255 and then the user may make a selection input to identify a path 550.

The method 600 may further comprise activating an alarm on the user device 208 when it is time to leave the current position 530 and travel along the path 550 selected in order to arrive at the event location 540 on time. The method 600 may further comprise once the user of the user device 208 has started on the path 550 to the next event location 540, a command may be transmitted to each access device 206 when the user device 208 is located within a position boundary of the access device 206 and the access device 206 may be adjusted when the command is received.

While the above description has described the flow process of FIG. 2 in a particular order, it should be appreciated that unless otherwise specifically required in the attached claims that the ordering of the steps may be varied.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of determining a path, the method comprising:
   receiving a plurality of current positions of the user device;
   receiving access granted information from one or more access devices;
   obtaining space details of one or more access devices in response to the access granted information;
   creating one or more paths in response to the plurality of current positions of the user device; the space details; and the access granted information;
   determining a next event for the user device;
   mapping an event location of the next event;
   obtaining a current position of the user device;
   obtaining an access list for the user device, the access list including access devices that the user device is authorized to activate;
   obtaining a path list including any of the one or more paths that go from the current position to the event location; and
   selecting a path from the path list.

2. The method of claim 1, further comprising:
   transmitting a command to each access device when the user device is located within a position boundary of the access device; and
   adjusting the access device when the command is received.

3. The method of claim 2, wherein the adjusting further comprises:
   unlocking a door lock.

4. The method of claim 2, wherein the adjusting further comprises:
   opening an elevator door.

5. The method of claim 2, wherein the adjusting further comprises:
   unlocking a turnstile.

6. The method of claim 1, wherein the determining a next event further comprises:
   checking a user schedule of a user device; and
   determining a next event on the user schedule in response to a current time.

7. The method of claim 1, wherein the determining a next event further comprises:
   receiving a user input selecting the next event.

8. The method of claim 1, wherein the ranking further comprises:
   removing paths from the path list that include an access device that is not included on the access list for the user device.

9. The method of claim 1, wherein the selecting further comprises:
   ranking each path of the path list in response to at least one of a path length, a path time, and a path frequency;
   displaying each path of the path list on the user device in an order of descending rank; and
   receiving a selection input from the user device, the selection input identifying one of the paths.

10. The method of claim 1, wherein the selecting further comprises:
    ranking each path in response to at least one of a path length, a path time, and a path frequency; and
    selecting the path with the highest ranking.

11. The method of claim 1, further comprising:
    activating an alarm on the user device when it is time to leave the current position and travel along the path selected.

12. An access control system comprising:
    a processor; and
    a memory comprising computer-executable instructions that, when executed by the processor, cause the processor to perform operations, the operations comprising:
    receiving a plurality of current positions of the user device;
    receiving access granted information from one or more access devices;
    obtaining space details of one or more access devices in response to the access granted information;
    creating one or more paths in response to the plurality of current positions of the user device; the space details; and the access granted information;
    determining a next event for the user device;
    mapping an event location of the next event;
    obtaining a current position of the user device;

obtaining an access list for the user device, the access list including access devices that the user device is authorized to activate;

obtaining a path list including any of the one or more paths that go from the current position to the event location; and selecting a path from the path list.

13. The access control system of claim 12, wherein the operations further comprise:

transmitting a command to each access device when the user device is located within a position boundary of the access device; and adjusting the access device when the command is received.

14. The access control system of claim 12, wherein the determining a next event further comprises:

checking a user schedule of a user device; and determining a next event on the user schedule in response to a current time.

15. The access control system of claim 12, wherein the determining a next event further comprises:

receiving a user input selecting the next event.

16. The access control system of claim 12, wherein the ranking further comprises:

removing paths from the path list that include an access device that is not included on the access list for the user device.

17. The access control system of claim 12, wherein the selecting further comprises:

ranking each path of the path list in response to at least one of a path length, a path time, and a path frequency;

displaying each path of the path list the one or more paths on the user device in an order of descending rank; and receiving a selection input from the user device, the selection input identifying one of the paths.

18. The access control system of claim 12, wherein the selecting further comprises:

ranking each path of the path list in response to at least one of a path length, a path time, and a path frequency;

wherein the path is selected from the path list based on the highest ranking.

19. A method of determining a path, the method comprising:

determining a next event for the user device;

mapping an event location of the next event;

obtaining a current position of the user device;

obtaining an access list for the user device, the access list including access devices that the user device is authorized to activate;

obtaining a path list including any of the one or more paths that go from the current position to the event location; and selecting a path from the path list, wherein the selecting further comprises:

ranking each path of the path list in response to at least one of a path length, a path time, and a path frequency;

displaying each path of the path list on the user device in an order of descending rank; and receiving a selection input from the user device, the selection input identifying one of the paths.

20. An access control system comprising:

a processor; and a memory comprising computer-executable instructions that, when executed by the processor, cause the processor to perform operations, the operations comprising:

determining a next event for the user device;

mapping an event location of the next event;

obtaining a current position of the user device;

obtaining an access list for the user device, the access list including access devices that the user device is authorized to activate;

obtaining a path list including any of the one or more paths that go from the current position to the event location; and selecting a path from the path list, wherein the selecting further comprises:

ranking each path of the path list in response to at least one of a path length, a path time, and a path frequency;

displaying each path of the path list on the user device in an order of descending rank; and receiving a selection input from the user device, the selection input identifying one of the paths.

* * * * *